E. STEVENS.
Horse-Detaching Devices.

No. 218,591. Patented Aug. 12, 1879.

WITNESSES:
Henry N. Miller
C. Sedgwick

INVENTOR:
E. Stevens
BY Munn & C
ATTORNEYS.

UNITED STATES PATENT OFFICE.

ELIJAH STEVENS, OF SOMERVILLE, NEW JERSEY.

IMPROVEMENT IN HORSE-DETACHING DEVICES.

Specification forming part of Letters Patent No. 218,591, dated August 12, 1879; application filed June 9, 1879.

*To all whom it may concern:*

Be it known that I, ELIJAH STEVENS, of Somerville, in the county of Somerset and State of New Jersey, have invented a new and Improved Device for Detaching Horses from Carriages, of which the following is a specification.

Figure 3:
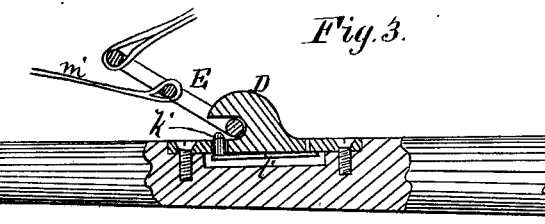
Figure 1:
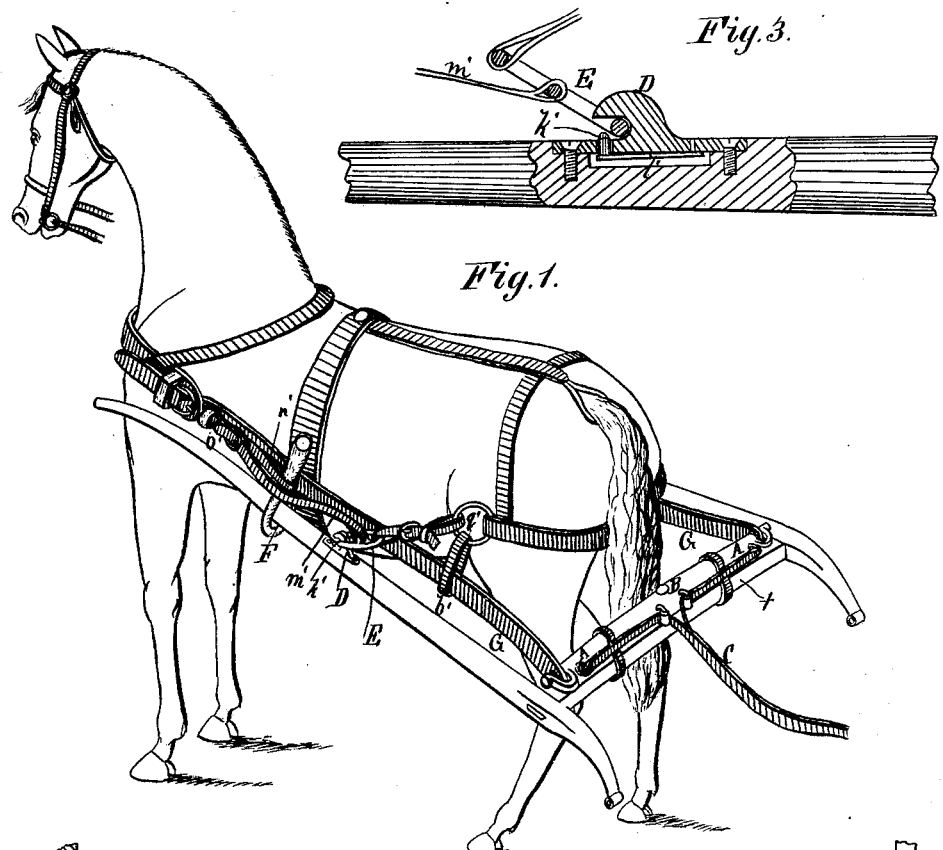
Figure 2:
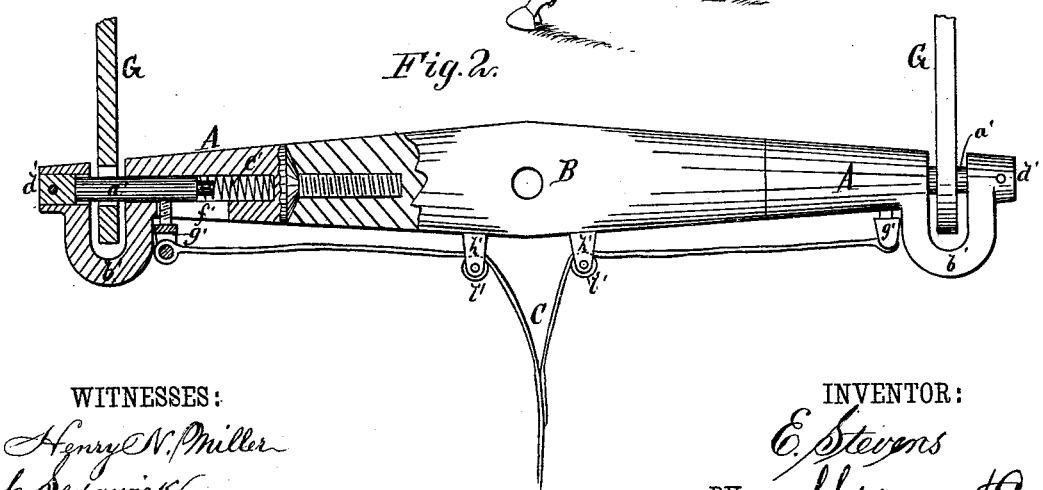

Figure 1 is a perspective view of a horse harnessed in shafts, and with the improved device attached. Fig. 2 is a plan of the whiffletree, showing part of the device. Fig. 3 is a longitudinal section of shaft, showing another part of the device.

Similar letters of reference indicate corresponding parts.

The object of this invention is to provide a simple and unfailing device for instantly detaching horses from vehicles, whether in motion or at rest.

A represents the looped sockets or ferrules, that are secured on the ends of the whiffletree B, and are provided with bolts or pins $a'$, that are held in position across the loops $b'$ by the action of the spiral springs $c'$, the bolts entering the sockets in the tips $d'$ sufficiently far for a firm hold therein.

Fastened at right angles into the bolts, through the slots $f'$ of the ferrules, are the pins $g'$, provided with broad slotted heads for the attachment thereto of the detaching-straps C, that lead from the pins $g'$ along the rear of the whiffletree, through the heads of the pins $h'$, that are provided with rollers $i'$, and are then united to form one strap, that is designed always to be within reach of the driver's hand.

The holdback-loop D is provided with a pin, $k'$, held up by a spring, $l'$, sunk in a socket under the said loop; in the barred connecting-link E and its strap $m'$; and in the connecting-strap $n'$, that connects the shaft-tug F with the small chafing-piece $o'$.

The driver, wishing to detach the horse, pulls upon the strap C, which draws inward the bolts $a'$, so that the ends of the traces G slip from them, but are held up from the ground by the trace-carriers $b'$, that are attached to the breeching-rings $g'$. Then the horse is freed from the whiffletree, and as he moves forward a step the pull on the strap $m'$ disengages the link E from the holdback-loop D, and immediately, by means of the connecting-strap $n'$, the shaft-tug F is drawn off the shaft and the horse is free from the vehicle, and with the harness upon him so arranged that no part of it will drag upon the ground or be likely to catch upon anything should he run.

By this device a horse is attached to a vehicle in as secure a manner as by any other known; and in case of threatened accident he can be instantaneously disengaged, the strength of a child being sufficient for the purpose, and in such a manner that he cannot become entangled in the harness.

Having thus described my invention, I claim as new and desire to secure by Letters Patent—

1. The combination of the pin $k'$, spring $l'$, holdback-loop D, connecting-link E, and strap $m'$, connected to the draft part of the harness, substantially as and for the purpose described.

2. The connecting-strap $n'$, in combination with the shaft-tug F and chafing-piece $o'$, substantially as herein shown and described.

3. A device for detaching horses from vehicles, consisting of sockets or ferrules A, provided with bolts $a'$, springs $b'$, tips $d'$, and pins $g'$, pins $h'$, provided with rollers $i'$, straps C, pin $k'$, and spring $l'$, attached to holdback-loop D, link E, and straps $m'$ and $n'$, substantially as herein shown and described.

ELIJAH STEVENS.

Witnesses:
W. W. ANDERSON,
MORRIS M. CRATER.